April 30, 1963     H. T. HERTZOG     3,087,305

ENGINE STARTING APPARATUS

Filed Aug. 25, 1960     4 Sheets—Sheet 1

INVENTOR
HEBER T. HERTZOG.

BY
Herschel C. Omohundro
ATTORNEY

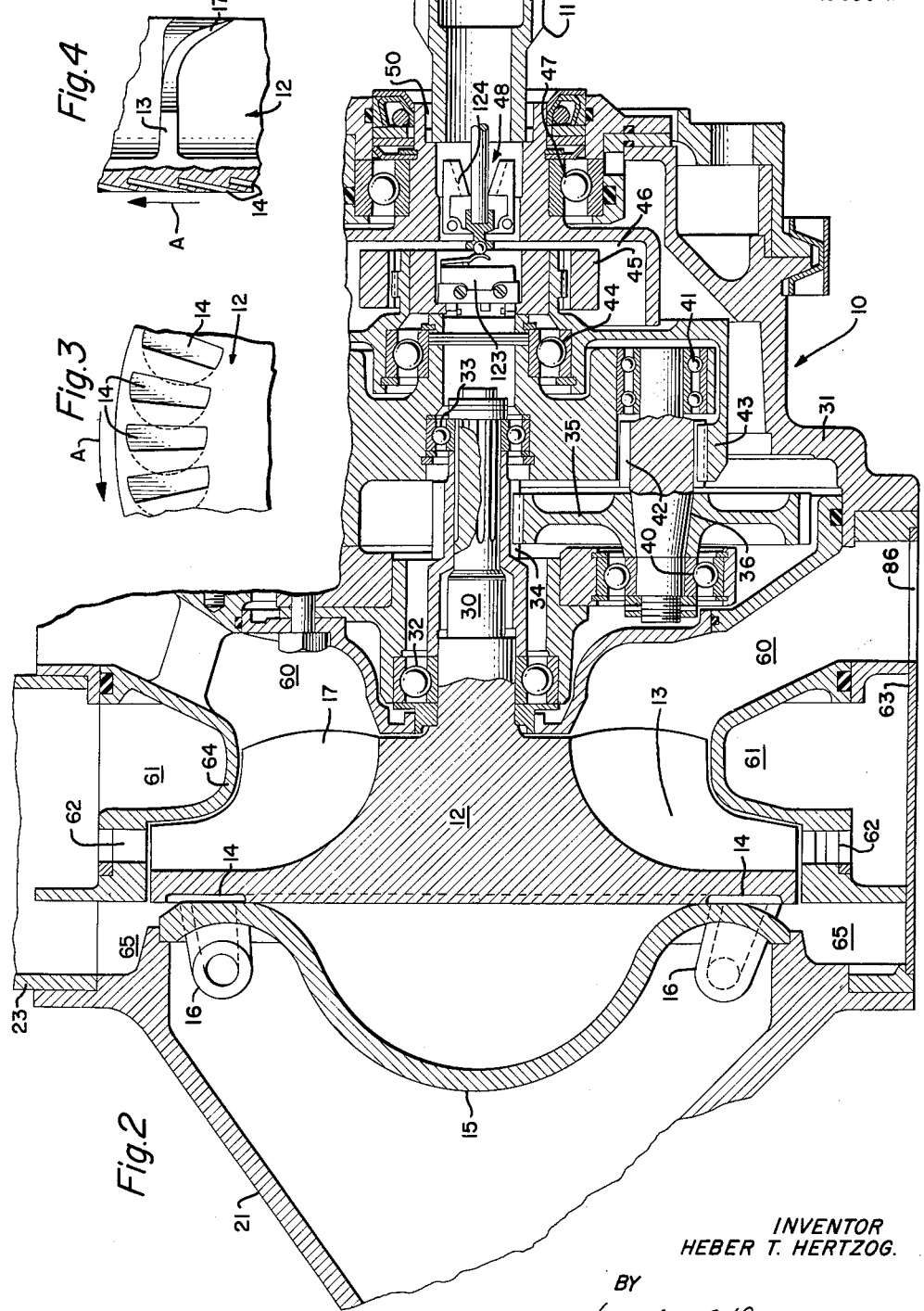

April 30, 1963 H. T. HERTZOG 3,087,305
ENGINE STARTING APPARATUS
Filed Aug. 25, 1960 4 Sheets-Sheet 3

INVENTOR
HEBER T. HERTZOG.
BY
Herschel C. Omohundro
ATTORNEY

April 30, 1963 H. T. HERTZOG 3,087,305
ENGINE STARTING APPARATUS
Filed Aug. 25, 1960 4 Sheets-Sheet 4

INVENTOR
HEBER T. HERTZOG.
BY
Herschel C. Omohundro
ATTORNEY

United States Patent Office 3,087,305
Patented Apr. 30, 1963

3,087,305
ENGINE STARTING APPARATUS
Heber T. Hertzog, Phoenix, Ariz., assignor to The Garrett Corporation, Los Angeles, Calif., a corporation of California
Filed Aug. 25, 1960, Ser. No. 51,830
19 Claims. (Cl. 60—39.14)

This invention pertains to engine starting apparatus and more particularly to engine starting apparatus of the turbine type adapted to start gas turbine type power plants. This application is a continuation-in-part of my copending application, Serial No. 662,438 filed May 29, 1957, now abandoned, entitled, Engine Starting Apparatus.

Previously, it has been suggested to use turbine type starters employing compressed air or similar pressurized gases as motive fluids for operating starting motors to start large gas turbine power plants. It has also been suggested to use high pressure, high temperature gases generated in stored energy systems, such as by burning a fuel-air mixture, igniting a solid propellant, or decomposing a monopropellant. The use of these two different types of motive fluid generally requires two different types of turbine blading for the most efficient use of the energy contained in each motive fluid. For example, turbine starters using compressed air of relatively low pressure as a motive fluid require large flow areas and can use blading of either the axial flow or centripetal flow type for efficient use of the energy contained in the compressed air, while on the other hand, high pressure, high temperature gases from stored energy systems require small flow areas and impulse type turbine blading for most efficient use of the energy.

A difficulty with starters utilizing high temperature, high pressure gases from stored energy systems is the problem of the turbine wheel overspeeding once the gas turbine power plant is started and the starter disconnected from the power plant. This is especially important in cartridge type starters where the quantity of gas available depends upon the size of the cartridge. If the gas turbine is started before the supply of gas is completely expended, the turbine wheel can reach dangerously high speeds after it is disconnected from the gas turbine power plant and before the cartridge is expended. Previously, it has been suggested to overcome this difficulty of cartridge type starters by providing some means for venting the cartridge to the atmosphere once the gas turbine power plant is started. While this solution is satisfactory, it adds considerable mechanism to the starter which is subject to failure, in which case the starter will still reach dangerously high speeds.

This invention solves the above problems by providing a unique starter construction utilizing a turbine wheel having reaction type blading on one side and impulse type blading on the opposite side. Thus, the starter of this invention is capable of efficiently utilizing either low pressure compressed air or high pressure, high temperature gases generated by igniting and burning a cartridge containing an explosive mixture or burning a fuel-air mixture as a motive fluid. Due to the pressures and temperatures of the gas generated in stored energy systems, it can be utilized most efficiently by impulse type blading while low pressure compressed air can be utilized most efficiently by reaction type blading. The reaction blading used is of the centripetal type having an inlet at the outer periphery of the turbine wheel and an exhaust adjacent the hub of the wheel.

The problem of overspeeding of the starter when using high pressure, high temperature gaseous fluids is solved by utilizing the side of the turbine wheel containing the centripetal turbine blades as a centrifugal compressor. Thus, these particular turbine blades have a dual function and may be termed turbine-compressor blades. By designing the reaction blades with exducer portions shaped for most efficient operation as centripetal type reaction blades, they will be inefficient as centrifugal compressor blades operated in the same direction of rotation. It is usually desirable in designing the exducer portions of turbine blades to curve them backward, or opposed to the direction of rotation of the turbine wheel, in order to increase their efficiency. This reverse curvature of the blades decreases their efficiency as compressor blades when they are rotated in the same direction. It has been discovered that reaction type blades designed in this manner and driven as centrifugal compressor blades will absorb an increasing amount of power with an increasing speed of the wheel, so that the wheel has a maximum speed beyond which it is impossible to accelerate. It is possible to design the impulse side of the turbine wheel so that substantially the same output torque and ultimate speed may be obtained regardless of whether the centripetal side of the turbine is used with low pressure compressed air or the impulse side is used with high pressure, high temperature gases.

Accordingly, the principal object of this invention is to provide a novel turbine type starter for internal combustion engines utilizing either low pressure compressed gases or high temperature, high pressure gases as the motive fluid.

Another object of this invention is to provide a starting motor of the turbine type having a unique means for limiting the ultimate speed of the turbine rotor which is self-operating and requires no mechanical controls.

Another object of this invention is to provide a starting motor of the turbine type having a turbine rotor which is provided with centripetal type reaction blading on one of its radial surfaces and an annular row of impulse type blading on its other radial surface.

Another object of this invention is to provide a starting motor of the turbine type having a turbine rotor which is provided with centripetal type turbine blading having a backwardly curved exducer portion on one of its radial surfaces and impulse type blading on its other radial surface.

Still another object of this invention is to provide a unique means for aerodynamically limiting the ultimate speed of the fluid operated turbine.

Still another object of the invention is to provide engine starting apparatus which may be operated by either of two types of fluid under pressure, the apparatus having one means for limiting the speed of the turbine wheel when being driven by one type of fluid and another means for controlling the turbine wheel speed when being driven by the other type of fluid.

An object of the invention is to provide engine starting apparatus having a turbine wheel with buckets for receiving gases from a cartridge burning mechanism to effect rotation of the wheel, the wheel having blade and shroud means formed to function as a compressor to load the wheel when it is being driven by the cartridge gases and thus limit rotation to a safe speed.

A further object of the invention is to provide engine starting apparatus having a turbine wheel formed for operation by fluid under pressure from a source outside the apparatus, means being provided to control the application of fluid under pressure from the outside source to the wheel in response to the speed of the engine being started or some other part between the engine and the turbine wheel.

These and other objects and advantages of this invention will be more apparent to those skilled in the art to which it pertains from the following detailed description of a preferred embodiment when taken in conjunction with the attached drawings, in which:

FIG. 2 is a longitudinal sectional view of a portion of the starting motor shown in FIG. 1 drawn to an enlarged scale;

FIG. 3 is an end view of a portion of the turbine wheel showing a few of the impulse blades;

FIG. 4 is a plan view of a portion of the turbine wheel with the impulse blades shown in section;

Figure 1:
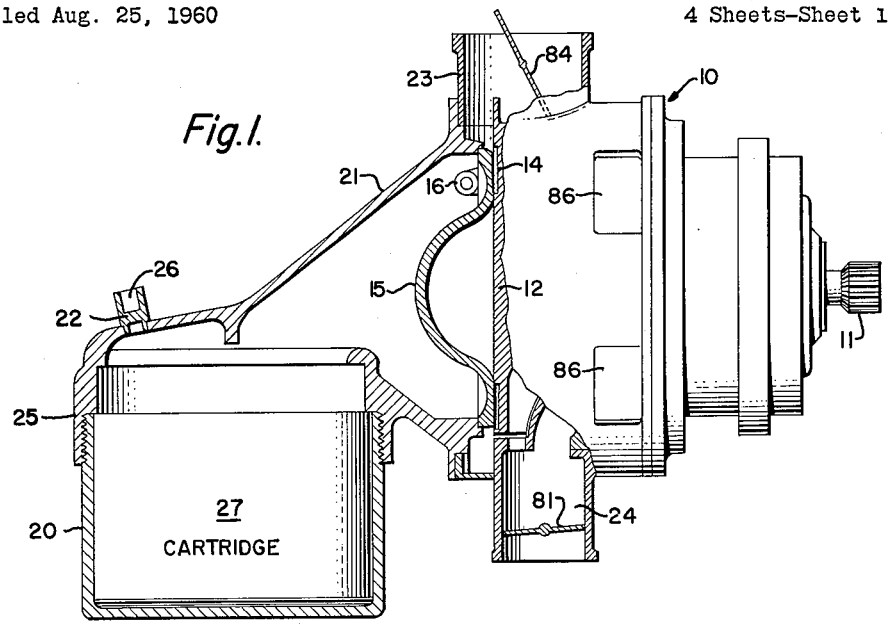
FIG. 1 is an elevational view partly in section of a starting motor constructed according to this invention.

Referring to FIGS. 1, 2, 3, and 4, there is shown a turbine type starter motor 10 having an output shaft 11 which may be connected to a gas turbine power plant to be started. The starting motor 10 is provided with a turbine wheel 12 which has a plurality of circumferentially spaced centripetal blades 13 formed on its right-hand radial surface which may be referred to as turbine-compressor blade means since they function, as explained below, both as turbine blades and compressor blades. Turbine wheel 12 also has an annular row of impulse type turbine buckets 14 formed on the other radial surface. The left-hand end of the turbine housing is closed by means of a nozzle plate 15 which is provided with a plurality of suitable nozzles 16. The nozzles 16 are mounted on the nozzle plate 15 at the proper angle to direct a stream of high pressure, high temperature gas against the impulse type turbine buckets 14 to effect the rotation of the wheel 12.

Also, attached to the left side of the starter housing is a duct 21 which is designed to conduct the high pressure, high temperature gas, generated by igniting and burning a cartridge 27, to the nozzles 16. Secured to a downwardly extending tubular portion 25 formed on the end of the duct 21 by any desired means, such as an interrupted thread, is a cartridge breech 20. The cartridge breech 20 is of generally cup shape and is designed to contain a suitable cartridge 27. The cartridge 27 is formed of explosive powder or similar materials which are slow burning and capable of generating a large quantity of high temperature, high pressure gas when ignited. The duct 21 is also provided with a short outwardly extending tubular section 26 which contains a safety plug 22. The safety plug 22 should be designed to blow out in case the gas generated by the cartridge reaches a dangerously high pressure.

A tubular member 23 which is attached to the top of the starter housing forms one inlet for directing air to the centripetal turbine blades 13 and also forms the exhaust outlet from the impulse type turbine buckets 14 and from the centripetal blades 13 when they are functioning as compressor blades to limit the speed of the wheel 12 in response to the application of cartridge gases to the buckets 14. The tubular member 23 should be of sufficient size and positioned on the starter housing so that its opening will communicate with both the inlet to the centripetal blades and the outlet from the impulse blades. A shutoff valve 84 (shown schematically in FIG. 1) is mounted in the tubular member 23 so that the tubular member may be closed when desired, as will be explained below. In some cases it may be desirable to provide a second tubular member 24 on the starter housing for forming a second inlet to the centripetal turbine blades 13. Of course, the tubular member 24 need only connect with the inlet of the centripetal blades since only these blades are used when the starter is operated by an outside source of fluid pressure. In these cases, a second shutoff valve 81 (shown in FIG. 1) should also be mounted in the tubular member 24 to close the tubular member 24 when desired. Valve 81 is merely schematically indicated in FIG. 1; it may be of any suitable form, a pressure regulating and shutoff type valve being diagrammatically illustrated in FIG. 8 and described hereinafter.

The centripetal blades 13 (as seen in FIGS. 2 and 4) are each provided with an exducer portion 17 which is curved backwardly when considered with respect to the direction of rotation shown by the arrow A. This backward curvature of the exducer portion of the blade increases the efficiency of the turbine wheel when it is operated as a centripetal turbine. The opposite is true when the turbine wheel is rotated in the same direction (indicated by the arrow A in FIG. 4) to operate as a centrifugal compressor since exducer portion 17 will then be curved in the opposite direction for most efficient operation as an inducer for a centrifugal compressor. This difference in efficiencies permits the designing of an efficient centripetal turbine wheel and an inefficient centrifugal compressor wheel when using the same blades and the same rotational direction. Thus, the power absorbed by the starter, when it is operated on high pressure, high temperature gas, will be negligible at low speeds but sufficient at high speeds to limit the maximum speed of the starter when it is unloaded. By properly designing the centripetal blades, the ultimate speed can be limited to substantially the same value when the starter is operated on high pressure, high temperature gases, as when it is operated on low pressure compressed air. Of course, for any particular design it may be necessary to select the correct degree of curvature of the blades in order to limit the speed of the turbine to safe levels. In some instances it may be found unnecessary to curve the blades to secure the desired results.

Due to the fact that it is difficult, if not actually impossible, to control the generation of the high pressure, high temperature gas after the cartridge has once been ignited, the provision of means for limiting turbine speed is necessary. When the starting apparatus is operated pneumatically and low pressure air or other gases are employed, there will be no tendency for the turbine wheel to accelerate to dangerous speed levels. If the source of air or other gases is at high pressure, however, suitable pressure reducing or regulating valve means may be employed.

The turbine wheel 12, as seen in FIG. 2, is provided with an integral turbine shaft 30 which extends axially from its right side. The turbine shaft 30 is rotatably supported in a composite starting motor housing 31 by means of ball bearings 32 and 33. Mounted on the right end of the turbine shaft 30 is a sun gear 34 which meshes with a plurality of circumferentially spaced planet gears 35. Each of the planet gears 35 is mounted on a small stub shaft 36, which is rotatably supported in a fixed spider, formed in the composite starter housing, by means of ball bearings 40 and 41 at the ends of the shaft. Also mounted on each of the stub shafts 36 is a small pinion 42 which meshes with an internal ring gear 43. The internal ring gear 43 is rotatably supported in the starter housing by means of a ball bearing 44 and a projection thereon is connected with a piece forming the inner member 45 of an overrunning clutch. The outer member 46 of the overrunning clutch is rotatably supported by a ball bearing 47. The outer member 46 of the overrunning clutch is provided with a hollow bore in which the output shaft 11 is keyed by any desired means, such as a spline connection 50. The projection on the ring gear 43 is also provided with a central bore, this bore and that in the clutch member 46 receiving a speed responsive control mechanism designated generally by the numeral 48.

Such control mechanism and its operation will be set forth hereinafter.

The left end of the compostie starter housing 31 is provided with an annular section 64 having a generally U-shaped cross section. The section 64 has a portion disposed in close proximity to the free edges of the turbine wheel blades 13 to serve as a shroud for the turbine wheel. This portion of the section 64, the blades 13, and the surface of the turbine wheel between the blades are shaped to cause the air passages formed thereby to decrease in effective cross-sectional area from the region surrounding the center of the turbine wheel to the periphery thereof. This construction improves the operation of the wheel both as a turbine and as a compressor for limiting the speed of rotation of the wheel under the influence of the cartridge gases. The portion 64 of the starter housing is closed on its outer periphery, except at certain points, by a substantially annular cover member 63 to form an inlet plenum 61 for the centripetal blades 13. A nozzle ring 62 having a plurality of suitable vanes for directing a supply of low pressure compressed air against the centripetal blades 13 is formed integrally with the annular section 64. The air exhausted from the centripetal blades 13, when the wheel 12 is being operated as a turbine wheel driven by air under relatively low pressure, flows radially through a suitable outlet passageway 60 formed in the right-hand portion of the annular section 64 and through outlet ports 86 formed in cover 63. When the turbine wheel is driven by hot gases generated by burning the cartridge 27, the blades 13 will function as centrifugal compressor blades, drawing air from the atmosphere through the ports 86 and passageway 60 to the central part of the wheel. The blades 13 pick up the air and discharge it from the periphery of the wheel through nozzles 62. Such air flows from the plenum 61 throuhg tube 23 with the gases exhausted from the impulse buckets 14.

The impulse type turbine buckets 14 exhaust into an annular exhaust plenum 65 also formed in the section 64 and surrounding the periphery of the turbine wheel 12 at the left side of the support for the nozzle ring 62. The exhaust plenum 65 is enclosed on its periphery by the plate 63 used for enclosing the inlet plenum 61 and both are connected to the common tubular member 23, described above. In certain instances it may be desirable, due to the high temperature and corrosiveness of the cartridge gases, to provide the tube 23 and exhaust duct leading therefrom with partition means to keep the gases from mixing. In such case, the same duct conveys the discharged air and gases to the exterior of the engine compartment even though they do not mix with each other.

When the starting motor, described above, is operated on low pressure compressed air, the air supply, depending upon its source, may be connected to either the tubular member 23 or the tubular member 24. Of course, when the compressed air supply is connected to one of the tubular members 23 or 24, the valve 84 or 81 in the other duct must be positioned so as to close the unused tubular member. The compressed air will then flow through the openings in the nozzle ring 62 and through the centripetal turbine blades 13 to rotate the turbine wheel 12. A portion of the compressed air supply will also flow into the cartridge gas exhaust plenum 65 and through the impulse turbine buckets 14. The flow of this portion of the air supply will, of course, "dead end" when it reaches the closed end of the cartridge breech 20 (shown in FIG. 1). Thus, no substantial amount of the compressed air supply will be lost due to leakage through the impulse turbine buckets. Further, the power absorbed by the impulse turbine buckets will be negligible. As previously indicated, the valve in the duct through which the compressed air is admitted to the turbine may, and preferably should, be of the regulating type. Such a valve is schematically shown in the control diagram of FIG. 8. Any suitable valve may be employed, the one illustrated being pneumatically actuated but rendered operative or inoperative by an electric solenoid. Such valve includes the butterfly element 84, an actuator 87, a pilot regulator 88, and an "on and off" valve 90 operated by the solenoid 91. The butterfly shaft is provided with a lever 92 which is connected by a rod 93 with a movable wall 94. In this instance the wall 94 is a diaphragm which is marginally clamped between two cup-shaped sections of the housing of the actuator 87, the housing sections and wall forming pressure receiving chambers 95 and 96. A spring 97 in one of the chambers tends to urge the butterfly toward a closed fail safe position. Fluid pressure supplied to the chamber 96 containing the spring will cause more rapid closing of the valve. Pressure supplied to the other chamber 95 will cause the valve to move toward an open position in opposition to the force of the spring 97.

In some instances the air supplied to the turbine may be taken from a source under pressure higher than that necessary or desired. The valve mechanism shown is designed to reduce the pressure to desired values. To such end the pilot regulator 88 has been provided. This member includes a body 98 and cap 99 which form a chamber divided into sections by a diaphragm 100 marginally clamped therebetween. The body has an axially extending bore for the slidable reception of a valve element 102. Valve 102 is movable in response to the movement of the diaphragm 100, such member being actuated by springs 103 and 104 and fluid pressure. Valve body 98 has a port 105 communicating with the air inlet duct by a tube 106 and another port 107 having limited communication with the chamber section at the underside of the diaphragm 100. Ports 105 and 107 are spaced longitudinally of the axial bore and communication between these ports is controlled by the movement of valve element 102. The chamber section above the diaphragm communicates with the atmosphere which forms a reference pressure. As fluid pressure beneath the diaphragm 100 increases, the valve moves in an upward direction to limit the flow of air under pressure to the chamber. A passage 108 leads from the chamber under the diaphragm 100 to the "on and off" valve 90.

Figure 8:
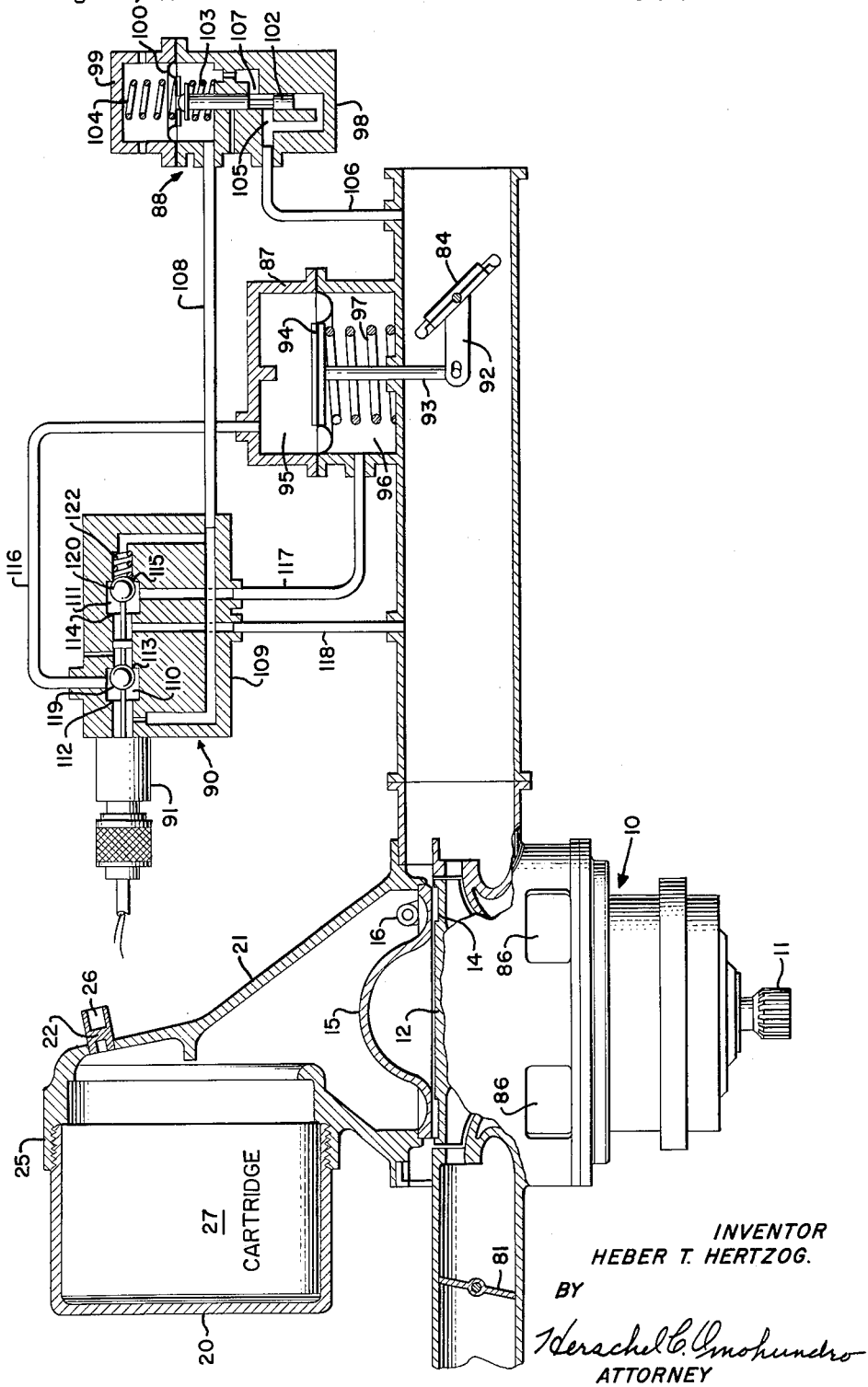
FIG. 8 is a schematic view of a starter and control system utilized during pneumatic starting operations.

Valve 90 has a body 109 with a pair of chambers 110 and 111 connected by a bore of slightly smaller diameter and forming therewith pairs of spaced valve seats 112, 113 and 114, 115. Chamber 110 communicates by way of passage 116 with the chamber 95 of the actuator. The chamber 111 communicates via passage 117 with the actuator chamber 96. Passage 108 communicates with chamber 110 via seat 112 and with chamber 111 via seat 115. The bore between seats 113 and 114 communicates via passage 118 with the air duct at the downstream side of the valve 84. Chambers 110 and 111 contain ball valve elements 119 and 120 which are connected for movement in unison in one direction by the solenoid 91 and in the other direction by a spring 122. When the solenoid 91 is energized and valve elements 119 and 120 are in engagement with seats 113 and 115, as shown in FIG. 8, regulated pressure from pilot regulator 88 is supplied to the chamber 95 at the upper side of the diaphragm. This application of pressure to diaphragm 94 tends to move valve 84 to an open position and admit air under pressure to the turbine. As air flows past valve 84 the pressure at the downstream side thereof will tend to increase and be transmitted via passage 118, chamber 111, and passage 117 to actuator chamber 96. Any increase in pressure in chamber 96 will be applied to the underside of diaphragm 94 and tend to move valve 84 toward a closed position. In this manner the fluid pressure supplied to the turbine will be modulated.

The application of current to solenoid 91 may be controlled by any suitable switch. It may also be controlled by a limit switch 123 forming a part of the governor assembly 48 disposed in the central bores of the clutch member and ring gear. A centrifugal actuator 124 forming a part of the governor assembly 48 actuates the switch 123 to close valve 84 when a predetermined speed is reached by the turbine or by the engine being started.

Figure 7:
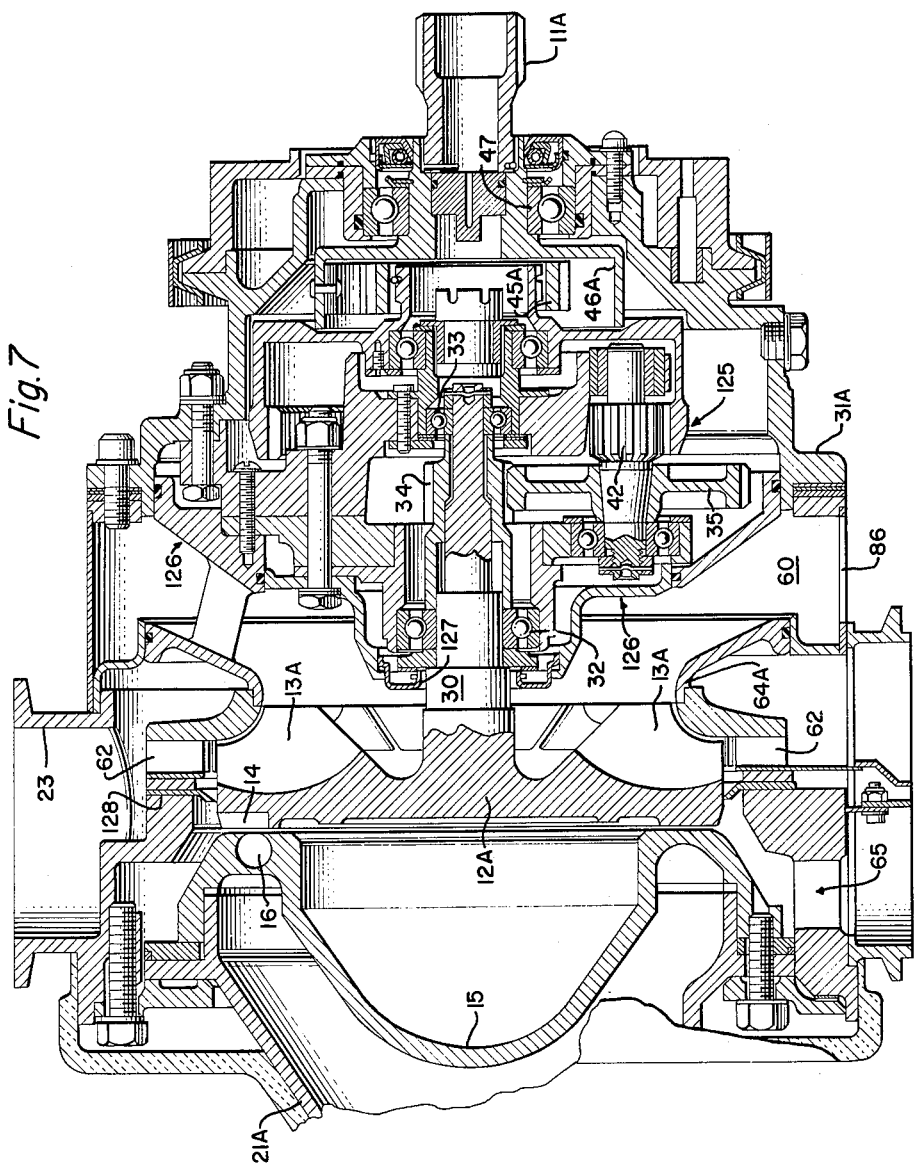
FIG. 7 is a longitudinal sectional view of a starter embodying a slightly modified form of the invention.

FIG. 7 shows a slightly more detailed longitudinal sectional view through a starter formed in accordance with the invention. This starter includes the same fundamental parts found in the form shown in FIG. 2, including the composite housing 31A, the cartridge gas generator and duct 21A, the turbine 12A, and the gear transmission 125 and overrunning clutch 45A, 46A between the turbine and the output shaft 11A. The reaction blades 13A on the turbine wheel 12A are of slightly different shape, but the housing or frame includes shroud means 64A which cooperates with the blades and the surface of the wheel between the blades to form passages extending from the region adjacent the center of the wheel to the periphery, the passages decreasing in effective cross-sectional area from the center region to the periphery of the wheel. The composite housing includes a wall 126 which separates the portion containing the gear transmission and one way clutch mechanism 45A, 46A from the portion containing the turbine and air passages. Seal means 127 are carried by such wall where the turbine shaft passes through to the transmission. The wall retains oil or other lubricant in the transmission compartment.

In the starter shown in FIG. 7, a seal element 128 is supported by the composite housing around the periphery of the turbine wheel and projects into close proximity with the wheel. This seal serves to resist the flow of used cartridge gases into the air passages. The duct employed to conduct the cartridge gases and compressed air discharged by the turbine when functioning as a speed limiting device may also be provided with partition means if it is desired to keep such fluids separated.

It should be obvious that, if desired, the composite housing could be provided with a short duct section in communication with the openings 86 and outlet passageway 60 to conduct the exhaust air resulting from pneumatic starting operations to a suitable exhaust region.

When the starting motor is to be operated on a high temperature, high pressure gas supply, such as a gas generated by igniting the cartridge 27, the side of the turbine wheel containing the impulse turbine buckets 14 is used. The high pressure, high temperature gas will be directed against the impulse turbine buckets by the nozzles 16, causing the turbine wheel 12 to rotate in the same direction as that caused by low pressure air and shown by arrow A in FIGS. 3 and 4. When the turbine wheel 12 is rotated by high pressure gas supplied by the cartridge 27, the centripetal turbine blades 13 will act as inefficient centrifugal compressor blades drawing air in through the outlet passageway 60 and discharging it through the openings in the nozzle ring 62, through the valve 84, and out through the tubular member 23 to the atmosphere. The operation of the side of the turbine wheel on which the centripetal turbine blades are formed as a centrifugal compressor provides two very important advantages: first, it provides a flow of cooling air over the turbine wheel 12 to remove the heat transmitted thereto by the high presure, high temperature gases impinging on the impulse turbine buckets 14; and second, it provides a simple means for aerodynamically limiting the ultimate speed of the starting motor.

Figure 6:
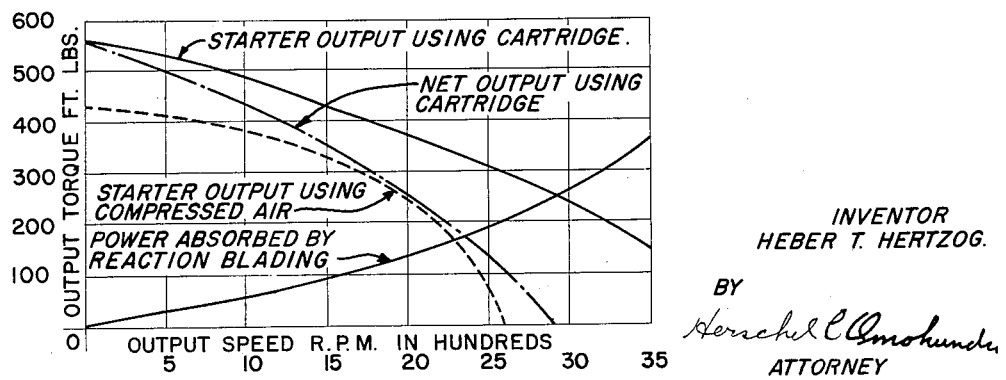
FIG. 6 is a graph showing the output torque of the starting motor versus the speed of rotation of the output shaft when utilizing either low pressure compressed air or high pressure, high temperature gases as the motive fluid.

The second advantage can be better visualized by referring to FIG. 6, which shows one solid line curve marked "starter output using cartridge" and a second solid line curve marked "power absorbed by reaction blading." The difference between these two curves gives the net output of the starting motor when operated on gas generated by the cartridge 27, which is illustrated by the curve shown by the dot and dash line marked "net output using cartridge." As can be easily seen, the ultimate speed is limited to the point at which the power absorbed by the centripetal turbine blades is substantially equal to the power developed by the impulse turbine. Also shown in FIG. 6 is a dotted curve, "output using compressed air," which represents the power developed when the starting motor is operated on low pressure compressed air. As can be seen, the ultimate speed of the starting motor is substantially the same regardless of whether the starting motor is operated on low pressure compressed air or on high pressure, high temperature gases. Of course, the ultimate speed of the starter should be slightly greater than the speed required to start the particular gas turbine power plant on which it is installed.

This invention thus provides a very simple means for limiting the ultimate speed of a starting motor while at the same time providing a starting motor capable of operating on two entirely different sources of motive fluid. The speed limiting means is simple and requires no additional mechanical controls or devices and thus is incapable of malfunctioning or being rendered inoperative. While the two types of turbine blades are shown as being formed on the opposite radial surfaces of the turbine wheel 12, they could be formed on separate turbine wheels which are coupled together by a driving connection. While this is possible, it is not desirable, because in case of failure of the driving connection between the two turbine wheels the means used for limiting the speed of the impulse turbine would be inoperative.

Figure 5:
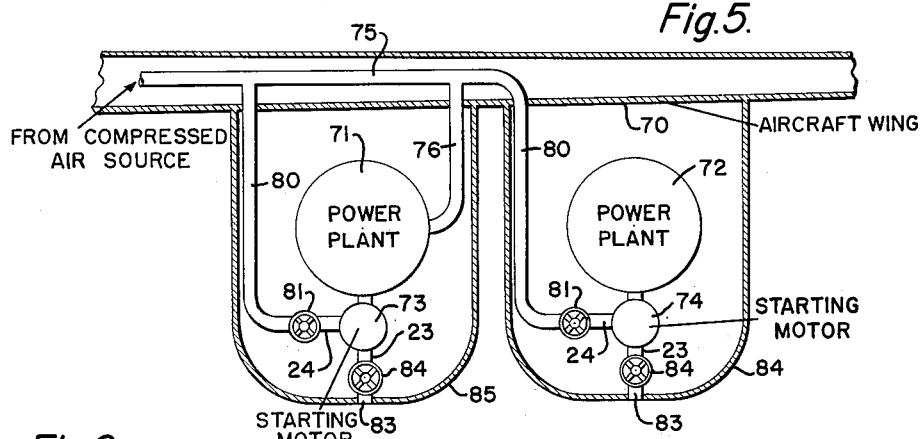
FIG. 5 is a schematic showing of a starting system incorporating the starting motor of this invention installed on an airplane.

Shown in FIG. 5 is a schematic system for starting a plurality of gas turbine power plants installed in an aircraft. Two power plants 71 and 72 of the aircraft are shown; they are suspended by any desired means, not shown, beneath the aircraft wing 70. The power plants are provided with starting motors 73 and 74, respectively, similar to those shown in FIGS. 1, 2, 3, and 4. At least one of the starting motors 73 and 74 should be equipped with a stored energy system similar to the cartridge system shown in FIGS. 1 and 2.

A supply conduit 80 is provided for connecting the tubular member 24 of each starting motor to a main supply conduit 75 mounted in the aircraft wing. The conduit 75 may lead to a suitable source of compressed air or other gas or to the bleed connection on the compressor section of another engine. In addition to the above connections, an additional conduit 83 is provided which is connected to the tubular member 23 of each starting motor and terminates flush with the skin 85 of the nacelle used for enclosing the jet engines 71 and 72. At least one of the gas turbines is provided with a bleed connection which is connected to the main supply conduit 75 by means of the conduit 76. The shutoff valves 81 and 84 mounted in the tubular members 23 and 24 may be remotely operated valves, if desired, and in addition, may be interlocked so that only the proper valves are open when any particular source of energy is used to operate the starting motors. For example, it may be desirable to provide means to insure that the valve 84 opens when a high pressure, high temperature gas is used as the motive fluid to permit the exhaust thereof, and that it closes when low pressure compressed air from the main supply conduit 75 is supplied through the tube 24 to prevent loss of air. It is also desirable to locate the valve 84 at one side of the connection between the tube 23 and the exhaust plenum 65, so that the valve stem and disc are out of the exhaust stream from the impulse buckets.

The above described system provides great flexibility since one of the starting motors may be operated from its self-contained energy system to start one of the gas turbine power plants. After one of the gas turbine power plants is started, compressed air may be bled from its compressor to the main supply conduit 75 to provide motive fluid for the remaining starting motors to start the respective gas turbines. Also, an external supply of compressed air may be used to start one of the gas turbines by closing the valves 81 and connecting the compressed air supply to conduit 83. Compressed air may then be bled from this gas turbine after operation thereof is initiated to start the remaining gas turbines, as described above. Thus, it can be seen that any one of several different sources of motive fluid may be used to start the various gas turbine power plants; this feature greatly increases the flexibility of the system.

While but one preferred embodiment of this invention has been described in detail, many modifications and improvements may occur to those skilled in the art within its broad spirit and scope.

I claim:

1. A starting motor for engines comprising: a turbine wheel mounted on a shaft, said shaft being rotatably supported in a housing; an annular row of turbine buckets formed on one of the radial surfaces of said turbine wheel; at least one nozzle disposed in said housing to direct a first source of motive fluid against said turbine buckets; an exhaust passageway formed in said housing to conduct spent fluid from said turbine buckets; a plurality of centripetal type turbine blades formed on the other radial surface of said turbine wheel to provide turbine-compressor blade means effective to compress gas when said turbine wheel is driven by the first source of motive fluid; additional nozzle means disposed in said housing for directing motive fluid from a second source against said centripetal turbine blades; an inlet passageway formed in said housing for connecting said second source of motive fluid to said additional nozzle means; an exhaust passageway formed in said housing for conducting spent motive fluid from said centripetal turbine blades; and disengageable means for connecting said shaft to an engine to be started.

2. A starting motor for engines comprising: a rotor disc mounted on a shaft, said shaft being rotatably supported in a housing; an annular row of turbine buckets formed on said disc; at least one additional series of turbine-compressor blades formed on said disc to effect compression of gas when said rotor disc is driven by gases impinged against said turbine buckets; at least one nozzle disposed to direct motive fluid from a supply against said turbine buckets; a motive fluid generator for said nozzle including a container disposed to contain a stored energy source; inlet and exhaust openings formed in said housing for establishing a fluid flow path through said additional series of turbine-compressor blades; an exhaust opening formed in said housing to conduct spent fluid from said turbine buckets, the exhaust opening of said turbine buckets and the inlet opening of said additional series of turbine-compressor blades being connected to a common conduit; and disengageable means for connecting said shaft to an engine to be started.

3. A starting motor for engines comprising: a turbine wheel mounted on a shaft, said shaft being rotatably supported in a housing; an annular row of impulse turbine buckets formed on one of the radial surfaces of said turbine wheel; at least one nozzle disposed in said housing to direct motive fluid from a first source against said impulse turbine buckets; an exhaust passageway formed in said housing for conducting spent fluid from said impulse turbine buckets; a plurality of centripetal type turbine blades formed on the other radial surface of said turbine wheel to provide turbine-compressor blade means effective to compress gas when said turbine wheel is driven by the first source of motive fluid; additional nozzle means disposed in said housing for directing motive fluid from a second source against said centripetal turbine blades; an inlet passageway formed in said housing for connecting said second source of motive fluid to said additional nozzle means; an exhaust passageway formed in said housing for said centripetal turbine blades; and disengageable means for connecting said shaft to an engine to be started.

4. A starting motor for engines comprising: a turbine wheel mounted on a shaft, said shaft being rotatably supported in a housing; an annular row of turbine buckets formed on one of the radial surfaces of said turbine wheel; at least one nozzle disposed in said housing to direct motive fluid from a first source against said turbine buckets; a motive fluid generator connected to said nozzle including a container disposed to contain an explosive charge; an exhaust passageway formed in said housing for conducting spent fluid from said turbine buckets; a plurality of centripetal type turbine blades formed on the other radial surface of said turbine wheel to provide turbine-compressor blade means effective to compress gas when said turbine wheel is driven by the first source of motive fluid; additional nozzle means disposed in said housing for directing motive fluid from a second source against said centripetal turbine blades; an inlet passageway formed in said housing for connecting said second source of motive fluid to said additional nozzle means; an exhaust passageway formed in said housing for conducting spent fluid from said centripetal turbine blades; and disengageable means for connecting said shaft to an engine to be started.

5. A starting motor for engines comprising: a turbine wheel mounted on a shaft, said shaft being rotatably supported in a housing; an annular row of impulse turbine buckets formed on one of the radial surfaces of said turbine wheel; at least one nozzle disposed in said housing to direct motive fluid from a first source against said impulse turbine buckets, said first source of motive fluid being a high pressure, high temperature gas resulting from the combustion of fuel; an exhaust passageway formed in said housing for conducting spent fluid from said impulse turbine buckets; a plurality of centripetal type turbine blades formed on another radial surface of said turbine wheel to provide turbine-compressor blade means effective to compress gas when said turbine wheel is driven by the first source of motive fluid; additional nozzle means disposed in said housing for directing motive fluid from a second source against said centripetal turbine blades; an inlet passageway formed in said housing for connecting said second source of motive fluid to said additional nozzle means; an exhaust passageway formed in said housing for said centripetal turbine blades; and disengageable means for connecting said shaft to an engine to be started.

6. A starting motor for engines comprising: a housing; a shaft rotatably mounted in said housing; a turbine wheel mounted on said shaft; a plurality of centripetal turbine blades formed on one of the radial surfaces of said turbine wheel to provide turbine-compressor blade means; an inlet and outlet means formed in said housing for establishing a flow path through said centripetal turbine blades, at least a portion of each of said centripetal blades adjacent said outlet being curved at an angle to the axis of said shaft and in the opposite direction to the normal direction of rotation of said turbine wheel; an additional plurality of turbine blades formed on another surface of said turbine wheel and disposed to rotate said turbine wheel in the same direction; nozzle means disposed in said housing for directing a source of motive fluid against said additional turbine blades; an outlet means formed in said housing for conducting spent fluid from said additional turbine blades; and disengageable means for connecting said shaft to an engine to be started.

7. A starting motor for engines comprising: a turbine wheel mounted on a shaft, said shaft being rotatably supported in a housing; an annular row of turbine buckets formed on one of the radial surfaces of said turbine wheel; at least one nozzle disposed in said housing to direct motive fluid from a first source against said turbine buckets; a motive fluid generator for said nozzle including a container disposed to contain a combustible charge; an exhaust passageway formed in said housing for conducting spent fluid from said turbine buckets; a plurality of centripetal type turbine blades formed on the other radial surface of said turbine wheel to provide turbine-compressor blade means effective to compress gas when said turbine wheel is driven by the first source of motive fluid; additional nozzle means disposed in said housing for directing motive fluid from a second source against said centripetal turbine blades; an inlet passageway formed in said housing for connecting said second source of motive fluid to said additional nozzle means; an exhaust passageway formed in said housing for said centripetal turbine blades, at least a portion of each of said centripetal blades adjacent the exhaust passageway for said centripetal turbine blades being bent at an angle to the axis of said shaft and in the opposite direction to the normal direction of rotation of said turbine; and disengageable means for connecting said shaft to an engine to be started.

8. A starting motor for engines comprising: a rotor disc mounted on a shaft, said shaft being rotatably supported in a housing; an annular row of turbine buckets formed on said disc; at least one additional series of turbine-compressor blades formed on said disc to effect compression of gas when said rotor disc is driven by gases impinged against said turbine buckets; at least one nozzle disposed to direct motive fluid from a source thereof against said turbine buckets; a motive fluid generator for said nozzle including a container disposed to contain a stored energy source; inlet and exhaust openings formed in said housing for establishing a fluid flow path through said additional series of turbine-compressor blades; an exhaust opening formed in said housing for said turbine buckets, the exhaust opening of said turbine buckets and the inlet opening of said additional series of turbine blades being connected to a common conduit; a shutoff valve disposed in said common conduit; and disengageable means for connecting said shaft to an engine to be started.

9. In an engine starting motor, the combination of: a rotating member having a series of turbine buckets thereon; means forming a driving connection between said rotating member and the engine to be started, said means serving to automatically disconnect said member from said engine after the latter has started; means for directing hot gases from a source thereof into the buckets on said member to effect rotation of said member; alternative means for effecting the rotation of said member and limiting the speed thereof when driven by the hot gases, said alternative means having blade members operatively disposed on said rotating member; means forming first and second passages leading to and from said blade members, fluid under pressure directed through said first passage effecting the rotation of said member in the same direction as that caused by said hot gases, said blade members serving when said member is driven by said hot gases to draw other fluid into said second passage and discharge the same through said first passage; means for directing hot gases discharged from said turbine buckets outwardly through said first passage at one side thereof; and valve means supported for movement between open and closed positions in said first passage, the support for said valve being located in offset relationship to the path of the hot gases.

10. In an engine starting motor, the combination comprising: a casing forming a turbine wheel chamber, a driving fluid inlet plenum and an annular series of nozzles establishing communication between said plenum and said turbine wheel chamber; a turbine wheel with centripetal blading supported for rotation in said chamber providing turbine-compressor blade means with the inlet ends of said blading registering with said nozzles, said casing forming an outlet leading from the outlet ends of said blading to the atmosphere; means forming a driving connection between said turbine wheel and the engine to be started, said means serving to automatically disconnect said turbine wheel from said engine after the latter has started; a series of impulse buckets provided on the opposite side of said turbine wheel from said centripetal blading; a second nozzle means for directing hot gases from a source thereof into said impulse buckets to effect rotation of said wheel; and cartridge receiving and burning means to provide said source of hot gases communicating with said second nozzle means, the rotation of said wheel by hot gases causing said centripetal blading to function as centrifugal compressor blading and draw air inwardly through said outlet and discharge the same through said annular series of nozzles.

11. A starting motor alternately drivable by compressed gases such as air or high temperature gases such as combustion gases for effecting engine starting comprising a housing; a shaft rotatably mounted in said housing; disengageable means on said shaft for connecting said shaft to an engine to be started; a turbine wheel mounted on said shaft; a plurality of turbine blade means disposed on one of the surfaces of said wheel; inlet means and outlet means formed in said housing for establishing a path through said turbine blade means for flow of high temperature gases to drive said turbine wheel in a first direction; a plurality of turbine-compressor blade means disposed on said turbine wheel to effect compression of gas when said turbine wheel is driven in said first direction by flow of high temperature gases through said path; nozzle means disposed in said housing for directing a source of compressed gases against said turbine-compressor blade means to drive said turbine wheel in the absence of high temperature gases flowing through said path; and an outlet formed in said housing for gases flowing from said turbine-compressor blade means.

12. In engine starting apparatus of the type having a rotating bladed member formed for operative connection with an engine to be started and means for directing driving fluid under pressure from a source thereof against the blades on said member to effect rotation of the member, the combination of: means for limiting the speed of said rotating member comprising a plurality of additional blade elements projecting from said rotating member, said additional blade elements being spaced to provide fluid passages therebetween, an end of each of certain fluid passages communicating with the ambient atmosphere and receiving fluid therefrom upon rotation of said rotating member; shroud means supported adjacent the outer edges of said additional blade elements, said shroud means and the surface of said rotating member between said additional blade elements being contoured to reduce the effective cross-sectional areas of said fluid passages from adjacent the center of said rotating member to the periphery thereof; and a common exhaust collector adjacent the periphery of said rotating member for the driving fluid and other fluid exhausted from the passages between said additional blade elements.

13. In engine starting apparatus of the type having rotating bladed means formed for operative connection with an engine to be started and means for directing motivating fluid under pressure from a source thereof against the blades on said bladed means to effect rotation thereof, the combination of: means for limiting the speed of said rotating means comprising a plurality of additional blade elements projecting from one side of said rotating means, said additional blade elements being spaced to provide fluid passages therebetween extending from a region adjacent the center of said means to the periphery thereof; means establishing communication between said passages at said region and the ambient atmosphere; shroud means supported adjacent the outer edges of said additional blade elements, said shroud means and a surface of said means between said additional blade elements being shaped to cause the effective cross-sectional areas of said fluid passages to decrease from the region adjacent the center of the means to the periphery thereof, said passages receiving and compressing air as said means is revolved; and means around the periphery of said rotating means for collecting the used motivating fluid flowing from the blades on said means and the compressed air flowing from said passages and conducting the same to exhaust.

14. Engine starting apparatus comprising: casing means; wheel means supported for rotary movement in said casing means, said wheel means having turbine buckets provided thereon and being formed for operative connection with an engine to be started; means connected with said casing for generating and directing gases under pressure against said turbine buckets to effect the rotation of said wheel means; a plurality of blade elements projecting from a surface in connection with said wheel means, said blade elements being spaced to provide air passages therebetween extending from a region adjacent the center of said surface to the periphery thereof; means establishing communication between said air passages at said region and the ambient atmosphere; shroud means supported in said casing means adjacent the outer edges of said blade elements, said shroud means and said surface between said blade elements being shaped to cause the effective cross-sectional areas of said air passages to decrease from the region adjacent the center of said surface to the periphery thereof; and means forming part of said casing means around the periphery of said wheel means for collecting the gases flowing from said buckets and the air flowing from said passages and conducting the same to exhaust.

15. Engine starting apparatus comprising: casing means; wheel means supported for rotary movement in said casing means, said wheel means having turbine buckets provided thereon and being formed for operative connection with an engine to be started; means connected with said casing for burning a cartridge to generate gases under pressure; nozzle means supported by said casing at one side of said wheel means for directing the generated gases against said turbine buckets to effect the rotation of said wheel means; a plurality of blade elements projecting from a surface in connection with said wheel means opposite that adjacent said nozzle means, said blade elements being spaced to provide air passages therebetween extending from a region adjacent the center of the wheel means to the periphery thereof; means establishing communication between said air passages at said region and the ambient atmosphere; shroud means supported in said casing means adjacent the outer edges of said blade elements, said shroud means, said blade elements, and said surface between said blade elements being shaped to cause the distance between said surface and said shroud to decrease from the region adjacent the center of the wheel means to the periphery thereof; and a common receiver for the spent cartridge gases and the air flowing from said passages.

16. Engine starting apparatus comprising: casing means; wheel means supported for rotary movement in said casing means, said wheel means having turbine buckets provided thereon; torque amplifying gear means driven by said wheel means and formed for motion transmitting connection with an engine to be started; means connected with said casing for burning a cartridge to generate gases under pressure; nozzle means supported by said casing at one side of said wheel means for directing the cartridge gases against said turbine buckets to effect the rotation of said wheel means; a plurality of blade elements projecting from a surface of said wheel means opposite that adjacent said nozzle means, said blade elements being spaced to provide air passages therebetween extending from a region adjacent the center of the wheel means to the periphery thereof; means establishing communication between said air passages at said region and the ambient atmosphere; shroud means supported in said casing means adjacent the outer edges of said blade elements, said shroud means, said blade elements, and the surface of said wheel means between said blade elements being shaped to cause the distance between said surface of said wheel means and said shroud to decrease from the region adjacent the center of the wheel means to the periphery thereof; a receiver for the spent cartridge gases and air flowing from said passages; means for conducting air under pressure from a source outside of said casing to said wheel means to effect rotation thereof when cartridge gases are not supplied; valve means for controlling air flow through said air conducting means; and switch means in said motion transmitting connection means for controlling the operation of said valve means, said switch means being responsive to centrifugal force caused by the rotation of said motion transmitting connection means.

17. Engine starting apparatus comprising: casing means forming a wheel chamber and a gear transmission chamber; turbine wheel means supported for rotation in said turbine chamber, said wheel means having turbine buckets provided thereon; transmission means including a member formed for motion transmitting connection with an engine to be started, reduction gearing operatively connected with said turbine wheel and an overrunning clutch connecting said reduction gearing and said member; means connected with said casing means for burning a cartridge to generate gases under pressure; nozzle means supported by said casing means at one side of said wheel means for directing the cartridge gases against said turbine buckets to effect the rotation of said wheel means; a plurality of blade elements projecting from a side of said wheel means opposite that adjacent said nozzle means, said blade elements being spaced to provide air passages therebetween extending from a region adjacent the center of the wheel means to the periphery thereof; means establishing communication between the air passages at said region and the ambient atmosphere; shroud means supported in said casing means adjacent the outer edges of said blade elements, said shroud means, said blade elements, and the side surface of said wheel means between said blade elements being shaped to cause the distance between the side surface of the wheel and said shroud to decrease from the region adjacent the center of the wheel to the periphery thereof; means for collecting the spent cartridge gases and air flowing from said passages and conducting them from said casing means; means for admitting air under pressure from a source outside said casing to said wheel to effect rotation thereof when cartridge gases are not supplied; valve means for controlling the admission of air from said outside source to said wheel; and speed sensing means responsive to the operation of said motion transmitting member to control the operation of said valve means.

18. Engine starting apparatus comprising: casing means; wheel means supported for rotary movement in said casing means, said wheel means having a plurality of sets of blade elements provided thereon, the blade elements of one set being spaced to provide air passages therebetween extending from a region adjacent the axis of the wheel means to the periphery thereof; means establishing communication between said air passages at said region and the ambient atmosphere; torque amplifying gear means driven by said wheel means, said torque amplifying means being formed for motion transmitting connection with an engine to be started; means connected with said casing for burning a cartridge to generate hot gases under high pressure; a first nozzle means supported in said casing for directing such hot cartridge gases against a predetermined set of said blade elements to effect the rotation of said wheel means in a certain direction, rotation of said wheel means in response to the application of cartridge gases to said predetermined set of blades serving to cause a flow of ambient air through said air passages; and a second nozzle means adjacent the periphery of said wheel for directing relatively cool fluid under relatively low pressure from a source outside of said casing to a predetermined set of said blade elements to effect the rotation of said wheel means in said certain direction when cartridge gases are not being supplied.

19. Engine starting apparatus comprising: casing means; wheel means supported for rotary movement in said casing means, said wheel means having a plurality of sets of blade elements provided thereon, the blade elements of one set being spaced to provide air passages therebetween extending from a region adjacent the axis of the wheel means to the periphery thereof; means establishing communication between said air passages at said region and the ambient atmosphere; torque amplifying gear means driven by said wheel means, said torque amplifying means being formed for motion transmitting connection with an engine to be started; means in said casing for burning a cartridge to generate hot gases under high pressure; nozzle means supported in said casing for direction such hot cartridge gases against a predetermined set of said blade elements to effect the rotation of said wheel means in a certain direction, rotation of said wheel means in response to the application of cartridge gases to said predetermined set of blades serving to cause the flow of ambient air to and through said air passages; a second nozzle means adjacent the periphery of said wheel means for directing fluid under pressure from a source thereof outside of said casing against one set of said blade elements to effect the rotation of said wheel means in said certain direction when cartridge gases are not being supplied; and an exhaust passage for collecting spent cartridge gases and fluid expelled from said passages and conducting such gases and fluid to a point of discharge.

References Cited in the file of this patent
UNITED STATES PATENTS

| | | |
|---|---|---|
| 1,170,547 | Kennedy | Feb. 8, 1916 |
| 2,411,552 | New | Nov. 26, 1946 |
| 2,435,042 | Johansson | Jan. 27, 1948 |
| 2,625,047 | Wood | Jan. 13, 1953 |
| 2,806,351 | Kent et al. | Sept. 17, 1957 |
| 2,820,341 | Amann | Jan. 21, 1958 |
| 2,842,937 | Clark | July 15, 1958 |
| 2,911,138 | Birmann | Nov. 3, 1959 |
| 2,914,296 | Bloomberg | Nov. 24, 1959 |
| 2,959,918 | West | Nov. 15, 1960 |